Jan. 9, 1951     W. F. ANDERSON     2,537,730
SNELL SHIELD
Filed Feb. 19, 1946
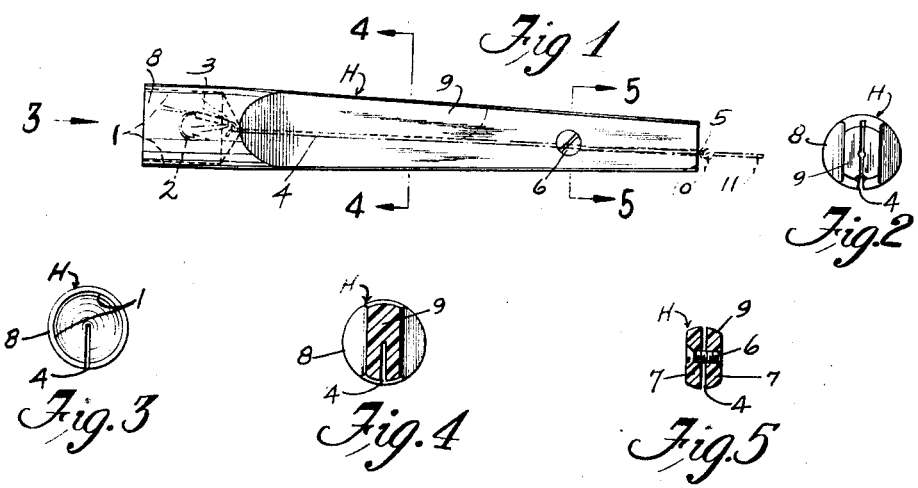
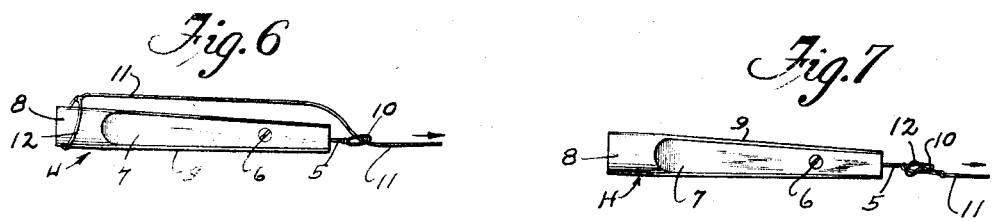
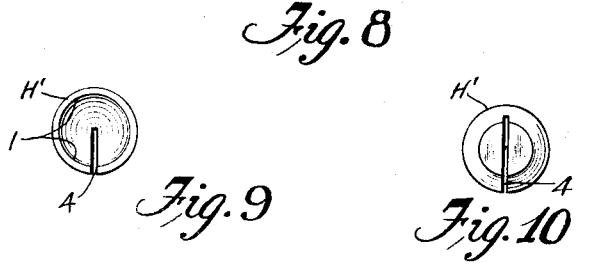
INVENTOR
WILLIAM F. ANDERSON
BY
Attorney Patented Jan. 9, 1951

2,537,730

UNITED STATES PATENT OFFICE 2,537,730

SNELL SHIELD

William F. Anderson, Wilmington, Calif.

Application February 19, 1946, Serial No. 648,597

3 Claims. (Cl. 43—57.5)

This invention relates to and has for a primary object the provision of a shield and holder for a fly or other type of lure and a snell to which the lure is attached so that one or more combined snells and lures may be conveniently carried in a pocket of a fisherman or in a suitable container for use as and when required.

It is well known that a complete fishing line usually includes a snell which is a length of gut with attached hook which is attached either by a "leader" or directly to a fish line attached to a "pole," and the snell frequently carries a lure in the form of a "fly," grub, worm or other type of lure, animate or inanimate arranged to hide the hook. It is also well known that, as in fishing for game fish such as trout, bass, etc., a fisherman may ascertain that a particular type of lure is ineffective, or a lure may be lost and it is necessary to substitute one type of lure for another or to replace a lost lure.

My invention, therefore, contemplates the provision of a simple, inexpensive and satisfactory holder, which may hold lures, hooks, snells, and snell lines of the same or different character, for selective use by a fisherman and so arranged that a desired unit may be readily detached from a particular holder and attached to the leader or directly to a fishing line. Thus, a fisherman may carry a plurality of holders, each with like or different lures for selective use, which may be quickly detached from their holders and attached to a line.

It is a further object to so form the snell holder that a snell may be readily attached to a leader or directly to a fishing line before the snell is removed from its holder.

A further object is to provide a holder for a snell which is so formed as to provide a recess at one end thereof for enclosing a hook and lure and a longitudinal slit in which the snell line is held against accidental displacement. Other objects may appear as the description of my improvements progresses.

I have shown a preferred form of device embodying my improvements in the accompanying drawing, in which:

Fig. 1 is an external view of a holder with a snell carried by the holder in position for use, at will;

Fig. 2 is a rear end view;

Fig. 3 is a front end view as seen in the direction of the arrow 3 in Fig. 1;

Figs. 4 and 5 are, respectively, transverse sections in the planes of lines 4—4 and 5—5;

Figs. 6 and 7 are views similar to Fig. 1, but showing the initial and final stages of attaching a fishing line to a snell while the snell line is still held in its holder;

Fig. 8 shows a modified form of holder; and

Figs. 9 and 10 are front and rear end views, respectively, of the form of holder illustrated in Fig. 8.

I prefer to form my improved snell holder of an integral piece of material, as at H in Fig. 1 or H' in Fig. 9, with a recess 1 in the forward end thereof of sufficient diameter and depth to receive and enclose a hook 2 and a fly or other type of lure 3. The bottom of the recess is preferably inwardly coned. A longitudinal slit 4 is provided which approaches the longitudinal axis of the holder so that a snell line 5 attached to hook 2 may be confined in slit 4 so as to prevent displacement of said hook and lure 3 from the holder when not in use, and the hook will be drawn into the recess centrally thereof to afford maximum protection to the fly. I provide a screw 6 which, when tightened, forces the opposite walls 7, 7 of the slit in the holder body (Fig. 5) together so as to tightly clamp the snell line 5 therebetween.

In the form of holder shown in Fig. 1, I form the holder with a cylindrical head 8 and a stem 9 having flattened sections 7, 7, as shown in Figs. 2, 4 and 5, so as to minimize the weight and size of the holders. Also, the body of the holder is tapered from the head 8 to the rear end thereof for a like purpose.

Preferably, the form of holder shown in Fig. 1 is made of a suitable plastic material, while the form of Fig. 9 may be made of wood; though the particular material employed is not critical.

Referring to Figs. 6 and 7, I will now explain certain advantages of my improved holder: Snell line 5 is formed with a closed loop 10 and a leader or a fishing line 11 is formed with a loop 12. While the snell line 5 is still held in a holder with its loop 10 extended from the rear end of the holder, the loop 12 of line 11 is inserted and drawn through loop 10 and thence forwardly of the holder until, as shown in Fig. 6, it is looped over the head 8 of the holder. Thereafter, when line 11 is pulled rearwardly over holder H or H' until it assumes the position shown in Fig. 7, the line 11 will be tied to line 5. Thus, when screw 6 is loosened and line 5 is moved out of slit 4 the hook 2, lure 3 and line 5 will be connected in readiness for use.

Ordinarily, loop 10 of line 5 will prevent the dislodgement of hook 2 and lure 3 from recess 1, but when screw 6 is tight the portions 7, 7 will be drawn together and line 5 can not be removed from or moved in the holder until screw 6 is loosened.

Obviously the shield may be arranged to accommodate more than one snell.

I claim:

1. A snell shield comprising: a holder recessed at one end for surrounding fish hooks with and without flies and longitudinally slit inwardly through the wall of the recess and partially through the holder, into which snells attached to said hooks may be inserted and from which they may be removed, and means for bringing together the walls of the slit in the holder for confining the snells in the holder against accidental displacement and with the looped end of the snell projecting from said holder.

2. A snell shield comprising: an elongated holder recessed at one end for receiving and shielding hooks with and without flies and having a longitudinal slit wide enough to permit entry of the snell but too narrow to permit passage of the hook, extending throughout the length of the holder and open to said recess and at the opposite end of the holder, and adjustable means for closing the walls of the slit together to retain the snell.

3. A snell shield as set forth in claim 2 and in which said recess is formed with a bottom of greatest depth at its center, and the slot at the recessed end is carried inwardly through the wall of the recess to the deepest point thereof, whereby when the fishhook and fly are drawn into the recess by the snell the shank of the hook will be located away from the walls of the recess and prevent crushing of the fly.

WILLIAM F. ANDERSON.

REFERENCES CITED

The following references are of record in the file of this patent:

UNITED STATES PATENTS

| Number | Name | Date |
|--------|------|------|
| 891,612 | Ericson | June 23, 1908 |
| 2,080,794 | Squassoni | May 18, 1937 |
| 2,401,886 | Shelton | June 11, 1946 |